Feb. 27, 1968   H. C. PFAFF, JR   3,370,868
COMBINATION BASE MEMBER AND COMPOSITE POLE
Filed Jan. 13, 1966   2 Sheets-Sheet 1

INVENTOR
H. C. PFAFF
BY   ATTORNEY

INVENTOR
H. C. PFAFF

BY ATTORNEY

United States Patent Office 3,370,868
Patented Feb. 27, 1968

3,370,868
COMBINATION BASE MEMBER AND
COMPOSITE POLE
Henry C. Pfaff, Jr., Summit, N.J., assignor to Pfaff and
Kendall, Newark, N.J., a corporation of New Jersey
Filed Jan. 13, 1966, Ser. No. 520,447
4 Claims. (Cl. 285—55)

ABSTRACT OF THE DISCLOSURE

A combination base member and composite pole for bridge rails, lighting poles, etc., having a base portion which includes a shouldered receptacle for receiving the end portion of a composite pole which consists of an inner and an outer tube of different materials disposed in concentric nested relationship, said inner tube extending beyond the terminal end of the outer tube and securing means, e.g., epoxy resin, for affixing the end portion of said outer tube within the base, the end portion of said inner tube being fused to said base portion.

---

Figure 1:
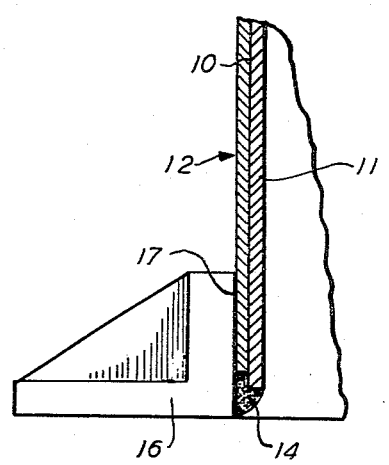

This invention relates to the forming of a seamless, bimetallic pipe or pole comprising an outer tube of predetemined, preferred abrasion or other characteristics and an inner tube of contrasting properties. For example, the latter may be of less expensive, different, or softer material. By way of further example, the inner tube may be a stainless steel core for stiffness and the outer tube of aluminum; for economy of manufacture the inner tube may be an inexpensive, heavy core, an expensive thin outer tube being used; a stainless steel outside tube may be used or corrosion resistance, with an aluminum inner tube; the outer tube may be made of heavy steel, and a thinner, stainless steel inner tube used for conveying materials internally.

Substantial saving in cost of material, and other advantages are achieved pursuant to the invention, as herein set forth.

The invention is adapted for use in bridge rails, lighting poles, bimetallic tubes such as aluminum and stainless steel, corrosion proof piping, metalic furniture, and for other general architectural, structural, physical and chemical puposes.

The cross section configuration of the pole formed pursuant to the invention may be predetermined, in accordance with the invention, to define an essentially integral pole with a composite wall formed of the inner and outer tubes as herein described.

The drawings, illustrating procedures and devices useful in carrying out the invention, and the description below, are exemplary only of the invention, which shall be deemed to cover all other devices and proecdures coming within the scope and purview of the appended claims.

Figure 2:
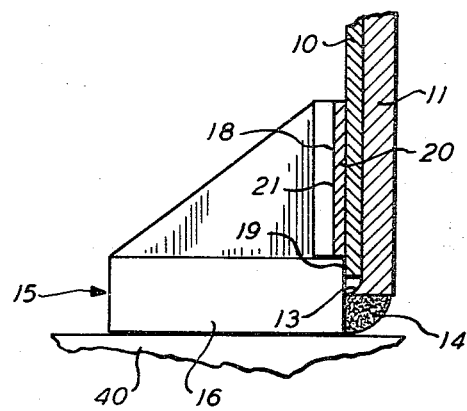
Figure 3:
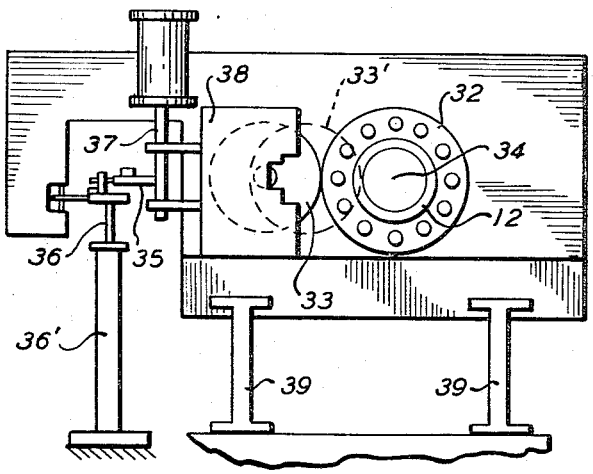
Figure 4:
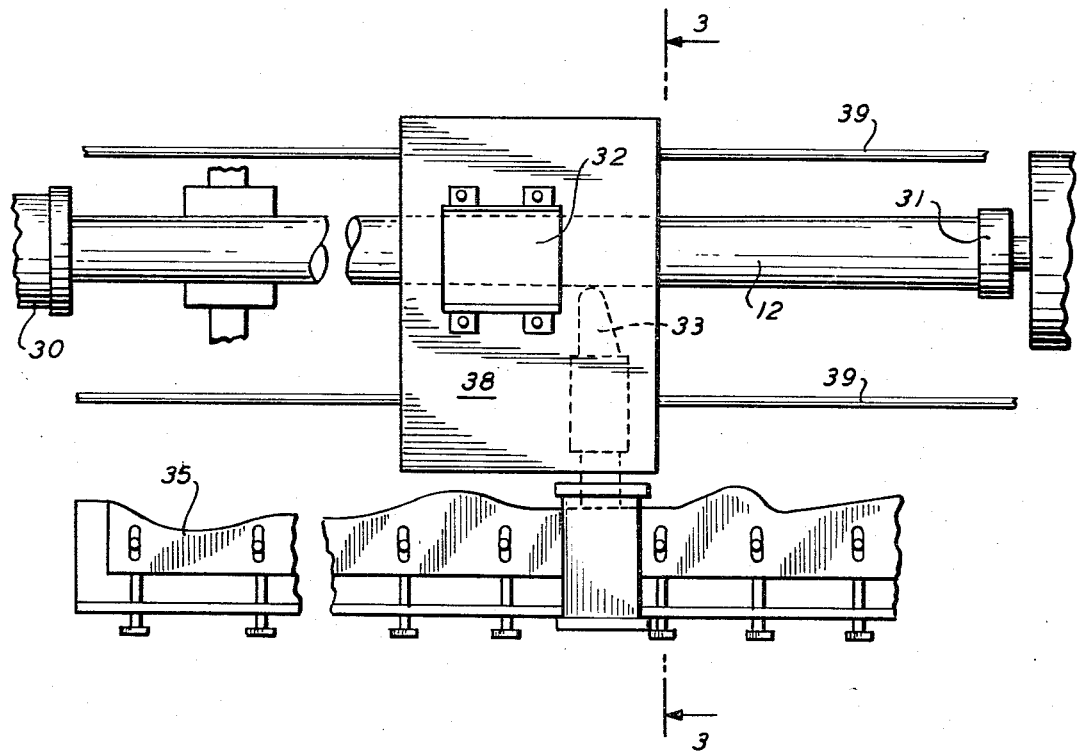
Figure 5:
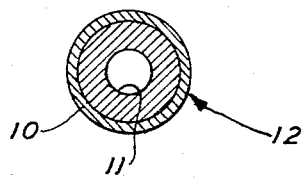

In the drawings, wherein similar reference characters indicate like parts:

FIG. 1 is a fragmentary, vertical, partly sectional view of a pole embodying the invention, shown secured to a base member, FIG. 2 is a similar view, showing another form of base member, FIG. 3 is a vertical transverse sectional view, taken at line 3—3 of FIG. 4, of a machine which may be used for fabricating the pole of the invention, FIG. 4 is a horizontal, partly fragmentary view thereof, taken at line 4—4 of FIG. 3, and FIG. 5 is a sectional view of the pole.

Pursuant to the invention, the pole 12 is shown formed of an elongated inner tube 11 positioned within outer tube 10 in essentially interfitting snug relation, with the inner tube 11 (FIG. 1) extending out of the pole 12, defined by the thus assembled tubes fabricated of predetermined relative thickness and different materials to provide the characteristics desired.

The extending inner end 13 of the inner tube 11 may be peened over the lower end of the outer tube (FIG. 2) and welded, as at 14 to a base member 15, interlocking the parts. The base member 15 may have a planar or horizontal portion 16 and a medially apertured vertical portion 17 which may receive the pole 12, the weld 14 securing the lower ends of the tubes 10, 11 to the base member 15. The medially apertured portion 17 of the base member may be defined by an upright vertical sleeve portion 18 thereof (FIG. 2) spaced inwardly of a shouldered portion 19 of the base member 15, so that, upon positioning the pole 12 in the base member, the apertured portion 17 will, for a substantial part of the length thereof, be spaced (as at 18, FIG. 2) from the pole. The pole supporting base 15 may be positioned on or secured to a suitable horizontal supporting surface 40 (FIG. 2).

An epoxy resin or other securing means 20 (FIG. 2) may be positioned in the space between the sleeve portion 18 and the pole 12, to further secure the parts together apart from the welding procedure above described and noted at 14, or in addition thereto.

Inner pole 11 may be selected for economy of manufacture of a relatively inexpensive material; outer tube 12 may be made of thinner costlier material such as stainless steel, etc. If desired, this arrangement may be reversed where, for example, a pole is to be used as a pipe to internally convey materials, in which case the outer tube 10 may be made of heavy steel and the inner tube 11 of stainless steel.

Manufacture of the pole

In the manufacturing procedure (FIG. 4) the inner and outer tubes are assembled and positioned for rotation on their axes and axially movably positioned in a suitable bearing 30 at one end and held engaged in a chuck 31 at the other end with the medial portion of the pole rotatably passing through a bearing 32. Concurrently with rotation of the pole, pressure may be applied radially inwardly to taper or alter the diameter thereof axially. A freely rotating roller 33 is mounted for reciprocation radially relative to the center 34 (FIG. 4) of the pole in conformity with a template 35 suitably positioned on a support 36 and engaged by an assembly 37 movably arranged on a casing 38 in confirmity with the pattern of the template 35 (FIG. 5) which thereby determines the axial configuration of the pole.

The tubes 10, 11 are initially preferably proportioned to interfit relatively snugly; as the casing 38 moves along the rails 39 axially of the tube 12 (the latter being continuously rotated) the wheel 33 will be pressed against the pole 12 as indicated in dotted lines at 33' (FIG. 3) to a greater or lesser degree depending upon the contour of the template 35. The template 35 is (FIG. 3) positioned on a suitable mounting rail 36 on suitable support 36'.

The resultant interlocking and deformation of the tubes 10 and 11 provides bimetallic pole 12 of essentially unitary form with the characteristics of the constituent tubes 10 and 11. The assembly may then be positioned in a base member 15 as above described and secured thereto.

While the foregoing disclosure of exemplary embodiments is made in accordance with the patent statutes, it is to be understood that the invention is not limited thereto or thereby, the inventive scope being defined in the appended claims.

I claim:
1. A base member including a horizontal portion and a vertical extending sleeve portion, said horizontal portion having a vertical opening therein, said sleeve portion being located radially outwardly of the walls defining said opening and concentric therewith thereby forming a shoulder, in combination with a composite pole comprising an inner and an outer tube in nested relationship, said composite pole extending through the sleeve portion and into the opening in the horizontal portion with the inner tube extending to a greater depth in the opening than the outer tube, means securing the inner tube to the horizontal portion and a securing means in the space between the sleeve portion and the outer tube.

2. A structure as set forth in claim 1 in which the inner tube is peened over the adjacent end of the outer tube.

3. A structure as set forth in claim 1 in which the tubes are of different materials, the inner tube being of a material capable of and being fused to said horizontal portion of the base member.

4. A structure as set forth in claim 1 in which the securing means is an epoxy resin.

References Cited

UNITED STATES PATENTS

| | | | |
|---|---|---|---|
| 2,445,273 | 7/1948 | Kennedy | 285—189 X |
| 2,613,958 | 10/1952 | Richardson | 285—55 |
| 3,152,820 | 10/1964 | Giampa | 285—423 X |
| 3,317,222 | 5/1962 | Maretzo | 285—55 |

FOREIGN PATENTS 720,238   4/1942   Germany.

CARL W. TOMLIN, *Primary Examiner.*

ROBERT SKUDY, *Assistant Examiner.*